INVENTOR.
VERNON L. NEWHOUSE
BY Morris B. Rabkin
ATTORNEY

INVENTOR.
VERNON L. NEWHOUSE
BY Morris A. Rabkin
ATTORNEY

United States Patent Office 3,032,749
Patented May 1, 1962

3,032,749
MEMORY SYSTEMS

Vernon L. Newhouse, Haddonfield, N.J., assignor to Radio Corporation of America, a corporation of Delaware Filed June 3, 1957, Ser. No. 663,195
12 Claims. (Cl. 340—174)

This invention relates to memory systems, and particularly to memory systems using magnetic elements.

Extensive use is made in information-handling systems of magnetic core memories using cores having substantially rectangular hysteresis characteristics. The magnetic elements are arranged in coordinate groupings such that any desired element can be selected by applying excitations to the coordinate lines linked to the desired element. Information is represented in a core by selectively establishing the core in one of its two stable, remanent states of magnetization.

In certain of the prior magnetic core memories, the read-out of the stored information is a destructive process. That is, the stored information is ascertained by applying excitations of sufficient intensity to change the state of the selected core. Accordingly, if it is desired to retain the initially stored information, additional circuitry and time are required to rewrite the information into the selected core.

It is an object of the present invention to provide improved magnetic memory systems wherein the stored information can be read out non-destructively.

Another object of the present invention is to provide an improved magnetic memory system wherein the stored information can be read out any desired number of times without requiring rewriting of the information.

It is also an object of the present invention to provide improved memory systems which can be operated at a higher speed than certain prior memory systems of similar type.

Still another object of the invention is to provide an improved memory system which is relatively simple in structure and which provides successive read-outs of the stored information from the same memory location without requiring the rewriting of information into that location.

The memory systems of the present invention make use of what appears to be a second threshold characteristic in an element of substantially rectangular hysteresis loop material. This second threshold effect is observed when excitation pulses of relatively large amplitude and relatively short duration are employed in operating the memory elements. The excitation pulses, even though their intensity exceeds the coercive force of the elements, do not produce any permanent change in the remanent condition of the elements. This so-called second threshold effect is described in detail in a copending application entitled "Memory Systems," filed by Vernon L. Newhouse and William L. McMillan on December 31, 1956, bearing Serial No. 631,796, now U.S. Patent No. 2,933,720, issued April 19, 1960.

According to the present invention, a plurality of magnetic elements are arranged in coordinate groupings by a plurality of sets of coordinate lines. Each separate element has a different combination of coordinate lines linked thereto. A common sensing means is coupled selectively to any desired one of the coordinate lines of a first set of lines. A common excitation means is selectively coupled to apply an excitation pulse to a desired one of the coordinate lines of a second set of lines. All of the group of elements linked by the desired second coordinate line respectively produce output signals in the coordinate lines of the first set. However, only the output of the desired coordinate line is sensed by the common sensing means.

Information may be written into any desired element by applying suitable excitations to the one coordinate line in each set that is linked to the desired element.

Figure 1:
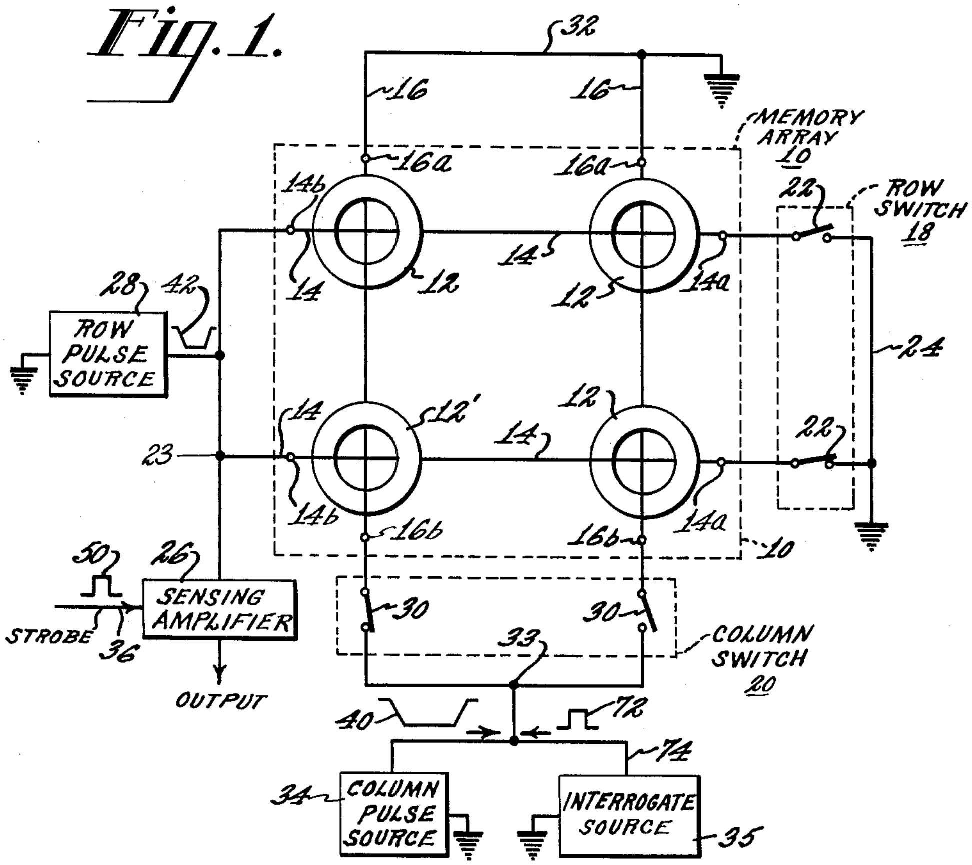
FIG. 1 is a schematic diagram of a two-dimensional memory system embodying the invention.

The two-dimensional memory array 10 of FIG. 1 has four separate cores 12 arranged in two rows and two columns. Any number of cores arranged in a desired number of rows and the same or a different number of columns may be employed. Each core 12 is made from substantially rectangular hysteresis loop material and has two remanent states, P and N. Certain ceramic materials, such as manganese-magnesium zinc ferrite, and certain metallic materials, such as molybdenum-permalloy, exhibit the desired rectangular hysteresis characteristics. A different one of two row coils 14 is linked to each different row of cores 12, and a different one of two column coils 16 is linked to each different column of cores 12. The row coils 14 correspond to a first set of coordinate lines each linking a different group of row cores, and the column coils 16 correspond to a second set of coordinate lines each linking a different group of column cores. A first switch means, such as a row switch 18, is used for selecting a desired row coil 14. A second switch means, such as a column switch 20, is used for selecting a desired one of the column coils 16. The row switch 18 is provided, by way of example, with two separate single-pole, single-throw switches 22, a different switch 22 being used for each different row coil 14. One extreme terminal **14*a* of each row coil 14 is connected to the movable arm of a corresponding one of the row switches 22. The fixed terminals of all the row switches 22 are connected to a row bus 24 which is connected to a source of reference potential designated ground and indicated in the drawing by the conventional ground symbol. All the row coils 14 are connected at their other extreme terminals 14*b* to a row junction 23. The row junction 23 is connected to the input of a common sensing amplifier 26 and to the output of a row pulse source 28**.

The column switch 20 is arranged similarly to the row switch 18 and has two separate, single-pole, single-throw column switches 30. A different column switch 30 is connected to each separate column coil 16. The extreme terminals **16*a* of the column coils 16 are all connected to the common ground by means of a common column bus 32. The other terminals 16*b* of the two column coils 16 are respectively connected to the movable arms of the two column switches 30. The fixed terminals of the column switches 30 are connected to a column junction 33. The output of a column pulse source 34, and the output of an interrogate source 35, are each connected to the column junction 33. The row pulse source 28, the column pulse source 34, and the interrogate source 35 each has a ground terminal. In practice, any suitable electronic switching means may be employed for the single-pole, single-throw row switches 22 and column switches 30. The sensing amplifier 26 may be any suitable sensing amplifier, for example, that described in an article by William N. Papian entitled "New Ferrite-Core Memory Uses Pulse Transformers," published in the March 1955 issue of Electronics, pages 194–197. The sensing amplifier 26 has a strobe input 36 and an output 38. Any suitable sources of current pulses may be used for supplying excitation pulses to the selected row and column coils 14 and 16**.

Information is written into any desired core 12 by using coincident-current selection technique. That is, the row and column pulse sources 28 and 34 are operated concurrently to apply separate excitations to a desired core 12. The desired core 12 is selected by operating the row and column switches 18 and 20 to select the row and column coils 14 and 16 intersecting in the desired core 12. A binary "1" is written into the desired core by applying one polarity, for example, negative polarity, excitation pulses to the selected row and column coils 14 and 16. Upon termination of the negative-polarity excitation pulses, the desired core is in one remanent state, for example, the state N. A binary "0" digit is written into a desired core 12 by applying the opposite, positive-polarity excitation pulses to the selected row and column coils 14 and 16. Upon termination of the positive excitation pulses, the desired core 12 is in the other remanent state, the state P. Any one excitation pulse, row or column, generates insufficient magnetizing force to produce any appreciable change in the initial magnetization of a non-selected core 12.

Assume, for example, that the desired core 12 is the core 12′ at the intersection of the second row and the first column of the array 10. The second row coil 14 is selected by closing the lower row switch 22. The first column coil 16 is selected by closing the left-hand column switch 30. The other row and column switches 22 and 30 remain open. Also assume that it is desired to write a binary "1" digit into the desired core 12′. In such case, the row and column pulse sources 28 and 34 are operated concurrently to apply negative-polarity pulses to the second row coil 14 and the first column coil 16. Each of the negative-polarity pulses applies a negative-polarity magnetizing force to the desired core 12′. The net negative magnetizing force is sufficient to change the desired core 12′ to the N state of magnetization, unless the core 12′ already is in the N state. Upon termination of the negative row and column pulses, the desired core 12′ is magnetized in the remanent state N, representing a binary 1 digit. By reversing the polarity of the row and column pulses, the desired core 12′ is magnetized in the remanent state P, representing a binary "0" digit.

Figure 2:
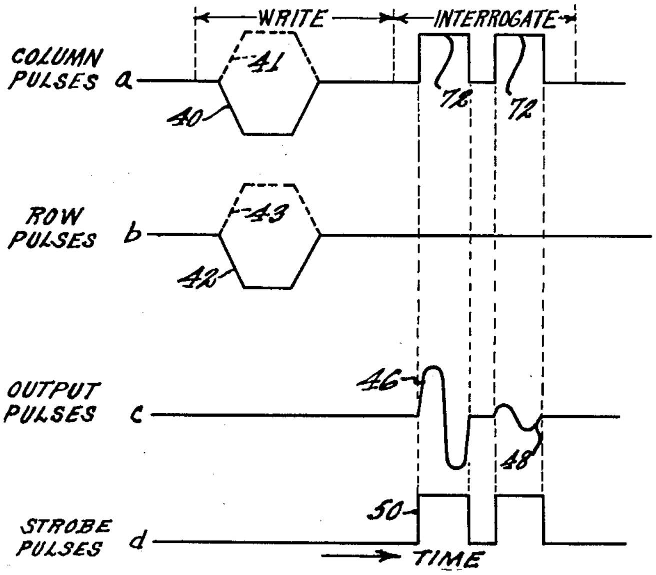
FIG. 2 is a timing diagram useful in explaining the operation of the system of FIG. 1.

The negative column write pulse is illustrated by the negative pulse 40, shown also in solid lines in line *a* of the timing diagram of FIG. 2; and the negative row write pulse is illustrated by the negative pulse 42 of line *b* of FIG. 2. The positive column and row write pulses are illustrated by the dotted pulses 41 and 43, respectively, of lines *a* and *b* of FIG. 2. During the write operation, voltages are applied to the sensing amplifier 26. However, the sensing amplifier does not respond to these applied voltages because the strobe input 36 is not activated at this time.

The information stored in any desired core 12 may be read out by operating the interrogate source 35 to apply a relatively intense and relatively short-duration interrogation pulse to the common junction 33. For example, when a core consists of five wraps of 0.125 molybdenum-permalloy tape on a bobbin of 0.125 inch outside diameter, the interrogation pulse 72 may be of 0.1 microsecond duration of 0.400 ampere turns.

The magnetizing force applied to the desired core 12′ by the interrogation pulse 72 produces a reversible flux change in the desired core 12′. This flux changes induces a voltage in the second row coil 14. The positive interrogation pulse 72 also produces a flux change in the core 12 located at the first row and first column of the array 10. However, substantially no current flows in the first row coil 14 as a result of this flux change, because the first row switch 22 is open at this time. The voltage induced in the second row coil 14 applies a signal to the common sensing amplifier 26. This applied signal is either of relatively large amplitude when the desired core 12′ is in the N remanent state representing a binary "1" digit, or a relatively small signal when the desired core 12′ is in the P remanent state representing a binary "0" digit.

The relatively large amplitude output signal from a desired core 12′ is represented in FIG. 2 by the pulse 46 of line *c* of FIG. 2. The pulse 46 has a positive phase followed by a negative phase. The sensing amplifier responds to both phases of the output pulse 46. A strobe pulse 50 is applied to the strobe input 36 of the sensing amplifier 38 concurrently with the application of the interrogation pulse 72 to the selected column coil 16. The strobe pulse 50 enables the sensing amplifier 26 during the entire interrogation operation. The relatively small-amplitude output produced by a desired core 12′ in its row coil 14 is indicated by the pulse 48 of line *c* of FIG. 2. The small-amplitude output pulse 48 is similar in shape to the large-amplitude output pulse 46. The sensing amplifier 26 is arranged to discriminate against the small-amplitude pulse 48.

A plurality of the cores 12 can be interrogated in succession by applying a succession of interrogation pulses 72 to the column junction 33 and operating the row and column switches 18 and 20 successively to select the desired cores 12. Each core 12 interrogated produces an ouput on its coupled row coil 14, thereby providing an indication of the information stored in that core. Note that an interrogation pulse 72 does not produce any permanent change in the remanent state of an interrogated core. As many interrogation operations as desired can be carried out without producing any appreciable permanent change in any of the array cores 12. New information can be written into a desired core 12′ after any one or more of the interrogation operations.

Figure 3:
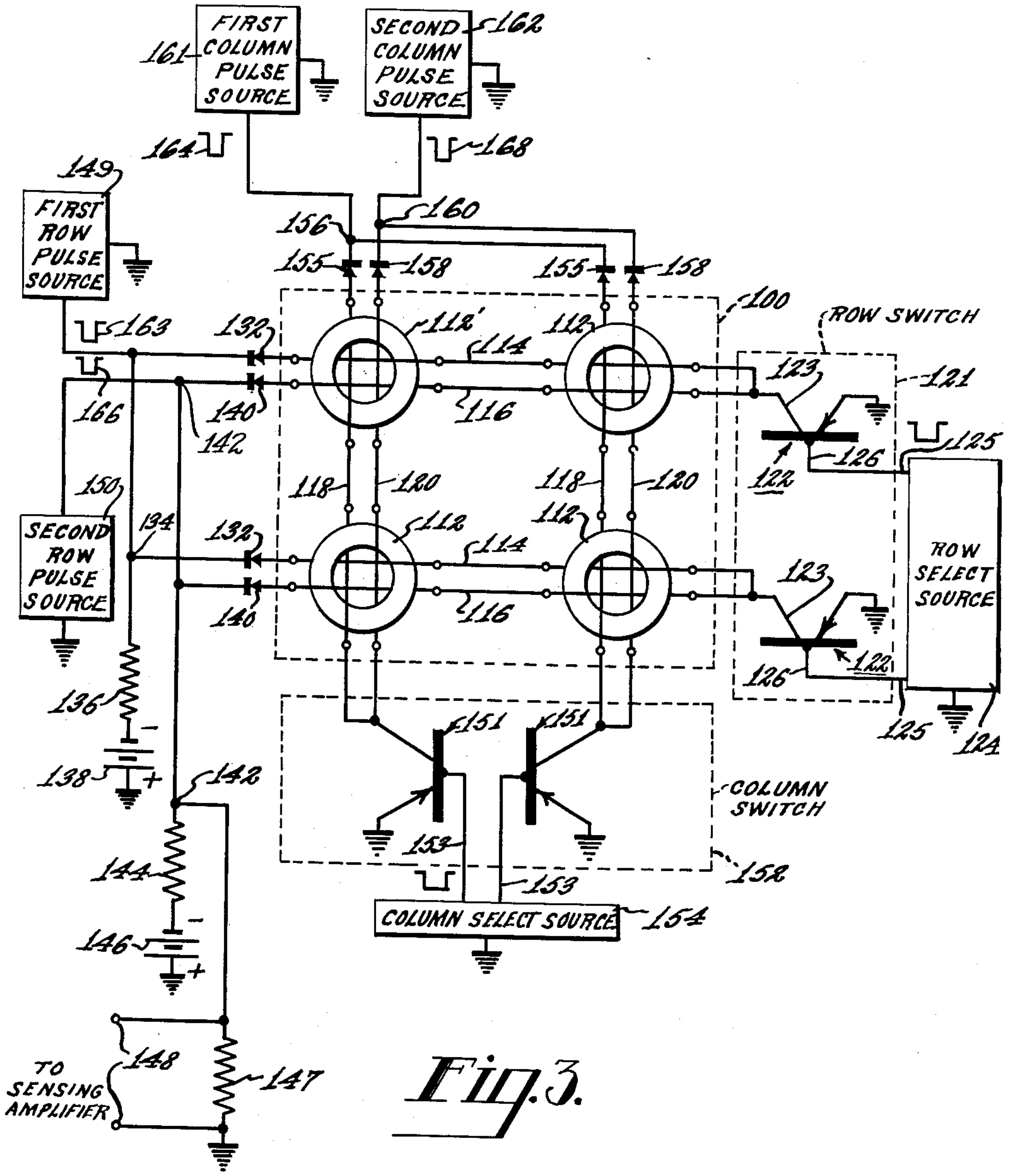
FIG. 3 is a schematic diagram of a two-dimensional memory system embodying the invention, using transistor switches.

The memory array 100 of FIG. 3 is provided with a 2 x 2 array of memory cores. Any number of cores in any desired number of rows or desired number of columns can be used. Each row of cores 112 is linked by a different pair of row coils 114, 116 designated, for convenience, upper and lower, respectively, and by a different pair of column coils 118, 120 designated, for convenience, left and right, respectively. Each upper row coil 114 is linked to both cores 112 of a row, in one sense, so as to apply positive magnetizing forces, for coil current in one direction, to the cores 112, and each lower row coil 116 is linked to both cores 112 of a row in a sense opposite that of the row coil 114 of that pair, so as to apply negative magnetizing forces, for coil current in one direction, to the cores 112.

Similarly, each left column coil 118 is linked to both cores 112 of a column in one sense so as to apply positive magnetizing forces, for coil current in one direction, to the cores 112. Each right column coil 120 is linked to both cores of a column in the opposite sense so as to apply negative magnetizing forces, for coil current in one direction, to the cores 112.

A row switch 121 is provided with a pair of transistors 122 each having collector, emitter, and base electrodes. The row switch transistors are each connected as a common emitter-type amplifier. The collector electrode 123 of the upper transistor 122 is connected in parallel to both row coils 114 and 116 of the first pair 114, 116 of row coils. A row select source 124 has a first output lead 125 connected to the base electrode 126 of the first row transistor 122. The second transistor 122 of the row switch 121 is similarly connected to both row coils 114 and 116 of the second pair of row coils at its collector electrode 123, and to the second output 125 of the row select source 124 at its base electrode 126. Each of the upper row coils 114 is connected in series with a different one of a pair of unilateral conducting devices, such as the diodes 132. The cathodes of these diodes 132 are connected to a junction point 134. The junction point 134 is connected through a current-limiting resistor 136 to the negative terminal of a bias source, such as a battery 138, having its positive terminal connected to ground. Each of the lower row coils 116, after linking both cores of the row, are connected in series with a different one of a pair of unilateral conducting devices, such as the diodes 140, to another junction 142. The other junction 142 is connected through a current-limiting resistor 144 to the negative terminal of another bias source, such as another battery 146, having its positive terminal connected to ground. The same source may be used as the bias sources 138 and 146. The other junction 142 also is connected through an output resistor 147 to ground. The output signal supplied to the sensing amplifier (as indicated) is taken across the output terminals 148 which are connected across the terminals of the output resistor 147. The two junctions 134 and 142 of the row coils 114 and 116, respectively, are connected to one output of a first and a second row pulse source 149 and 150. The row pulse sources each have a common ground connection.

The arrangement of the pairs of column coils 118 and 120 is similar to that described for the pairs of row coils 114 and 116. Thus, both column coils 118 and 120 of a pair are connected at one terminal to the collector electrode of one column transistor 151 of a column switch 152. The base electrode of the column transistor 151 is connected to one output 153 of a column select source 154. The other pair of column coils 118 and 120 are similarly connected at one terminal to the collector electrode of a second column switch transistor 151 which has its base electrode connected to another output 153 of the column select source 154. Both emitter electrodes of the column transistors 151 are connected to ground. The left column coils 118 are each connected in series with a different diode 155 to a common junction point 156. The right column coils 120, after linking the cores 112, are each connected in series with a different one of the diodes 158 to a second common junction point 160. The common column junctions 156 and 160 are each connected respectively to one output of a first and a second column puse source 161 and 162, respectively. The column pulse sources 161 and 162 each have another output connected to the common ground.

The row and column select sources 124 and 154 may be any suitable sources for applying biasing pulses selectively on a desired one output lead.

In operation, a desired core 112 is selected during either a write or an interrogation operation by first presaturating the row transistor 122 and the column transistor 151 coupled respectively to the pair of row coils 114 and 116 and the pair of column coils 118 and 120 linked to the desired core 112. Positive magnetizing forces are applied to the desired core 112 by operating the first pulse sources, and negative magnetizing forces are applied to the desired core 112 by operating the second pulse sources. During a write operation, one row and one column source are operated simultaneously. During an interrogation operation, only one of the column sources 161, 162 is operated.

For example, assume that it is desired to write a binary "0," represented by the state P, into a desired core 112, for example the core 112′, at the first row and first column of the array 100. The row select source 124 is operated to apply a negative bias pulse to the base electrode 126 of the upper transistor 122 of the row switch 121. The column select source 154 also is operated to apply a negative bias pulse to the base electrode of the left-hand transistor 151 of the column switch 152. The negative pulses applied to the base electrodes of the transistors 122 and 151 are sufficiently large to maintain the transistors saturated even during the maximum current that is injected into their collector electrodes by the row and column pulse sources.

After the row and column transistors are in their saturated conditions, a negative write pulse 163 is applied to the first row junction 134 by the first row pulse source, and another negative write pulse 164 is applied simultaneously to the first column junction 156 by the first column pulse source. Prior to the application of the write pulses 163 and 164, equal-amplitude currents flow in the one direction through both the row coils 114 and 116 of the upper pair of row coils. These currents flow from the common ground, through the emitter-to-collector path of the upper row transistor 122, in the one direction through the respective row coils 114 and 116 of the upper pair, through the current-limiting resistors 136 and 144, and the bias sources 138 and 146 to ground. The bias sources 138 and 146 and the various resistors are arranged so that equal currents flow in the row coils 114 and 116. The current flow in the row coils 114 and 116, as a result of the presaturation of the row transistor 122, are substantially equal to each other and are of relatively small amplitude. These row coil currents apply equal and opposite magnetizing forces to the cores 112 of the first row. Therefore, no net magnetizing force is applied to the cores 112 of the first row. The negative write current pulse 163 applies an additional current to the upper row coil 114. A resultant additional current flows from the common ground, through the emitter-to-collector path of the upper presaturated transistor 122 of the row switch 121, through the upper row coil 114 and the diode 132, then through the common junction 134, and then through the first row pulse source to ground. The negative column pulse 164 applies a current to the left-hand column coil 118 with a resultant current flow from the common ground, through the emitter-to-collector path of the transistor 151 of the column switch 152, through the left-hand column coil 118, the diode 155 of that coil 118, and through the common junction 156 and the first column pulse source to ground. The net positive magnetizing forces applied to the desired core 112′ by the current flow in the row coil 114 and the column coil 118 drives the core 112′ to the P state of saturation. Upon termination of the row and column drive pulses 163 and 164, the desired core 112′ is in the remanent state P. No current flows in the second-row coils 114 and 116 because the lower transistor 122 of the row switch 121 is fully cut-off. Likewise, no current flows in the second-column coils 118 and 120 because the right-hand one of the column switch transistors 151 is cut-off. No circulating current flows in the column coils 120 or the row coils 116 because of the back-to-back connection of the diodes 158 and 140 with respect to these coils.

The desired core 112′ can be changed to the N remanent state by applying a negative row select pulse 166 to the common row junction 142 and by simultaneously applying a negative column select pulse 168 to the common column junction 160. The row write pulse 166 applies a current pulse to the lower row coil 116 of the core 112′, and the negative column pulse 168 applies a current pulse to the right column coil 120 of the core 112′. The currents flowing in the lower row coil 116 and the right column coil 120 apply a net negative magnetizing force to the desired core 112′. Upon termination of the row and column write pulses 166 and 168, the desired core 112′ is in the N remanent state. A binary "1" or "0" digit can be written into any other desired one of the core 112 in similar fashion.

Information stored in the desired one of the cores 112, for example the core 112′ of the first row and column, can be read out non-destructively by operating the row and column select sources 124 and 154 to presaturate the upper row switch transistor 122 and the left-hand column switch transistor 151 and by applying an interrogation pulse to one of the column coils linked to the desired core. For example, the first column pulse source 161 may be used for generating a suitable interrogation pulse. Alternatively, a separate interrogation source, as described for the embodiment of FIG. 1, can be used.

When the upper row transistor 122 is presaturated, the emitter-to-collector current thereof divides equally between the first pair of row coils 114, 116. Equal amplitude and opposite-polarity magnetizing forces are applied to the first row of cores 112 by these row coil currents, and the magnetization conditions of the cores 112 are unchanged. Note that both diodes 132 and 140 of the first pair of row coils 114 and 116 are in their conductive conditions and, therefore, offer relatively low impedance to further current flow in the first pair of row coils.

When a negative-polarity interrogation pulse is applied, for example, to the first column junction 156, the diode 155 of the first column coil 118 is driven into conduction, and substantially all the emitter-to-collector current of the first column switch transistor 151 flows in the first column coil 118. As a result, a net positive magnetizing force is applied to the first column of cores 112 for the duration of the interrogation pulse. A reversible flux change is produced in both the cores 112 of the first column as a result of the net positive magnetizing force. However, the flux change in the core 112, located at the first column and the second row, does not produce any current flow in its linked row coils 114 and 116 because the lower row switch transistor 122 is cut-off.

The reversible flux change in the desired core 112', however, induces a voltage in the first row, lower coil 116 in a direction to drive its connected diode 132 further into conduction and induces a voltage in the first row, upper coil 114 in a direction to drive its connected diode 132 to nonconduction. Accordingly, a larger portion of the emitter-to-collector current of the presaturated row switch transistor 130 flows through the first row, lower coil 116. The amount of current increase in the row coil 116 is proportional to the amplitude of the induced voltage. The current change in the row coil 116 appears across the output resistor 147 as a corresponding voltage change.

If the desired core 112' is in one state, say the state P, relatively little reversible flux change is produced therein during a read operation, and relatively little voltage change is produced across the output resistor 147. When the core 112' is in the other remanent state N, a relatively large voltage is induced in the column coil 116, and a correspondingly large voltage is produced across the output resistor 147.

Upon termination of the interrogation pulse, the selected core 112' returns substantially to its initial remanent condition. As many readouts of the stored information as desired can be obtained from the 112' without changing its initial remanent state to any appreciable degree.

There have been described herein improved memory systems capable of providing non-destructive read-out of the stored information and capable of operating at relatively high speed.

What is claimed is:

1. In a magnetic memory system, the combination of plurality of magnetic cores of substantially rectangular hysteresis loop material, said cores being arranged in coordinate groupings by sets of coordinate lines, each set of lines including a plurality of pairs of coordinate lines, any pair of said lines of a set linking a group of said cores different from those linked by any other pair of lines of the same set, said groups of cores of one of said sets having certain cores in common, and some not in common, with cores of any different group of the other of said sets, a first line of any pair linking its group of cores in one sense and the second line of the same pair linking its group of cores in the sense opposite the one sense, a common sensing means, and means for selectively coupling said common sensing means to any one first line of one of said sets of lines.

2. In a magnetic memory system, the combination as claimed in claim 1, including means for applying an interrogation signal to any one of said lines of the other of said sets of lines.

3. In a magnetic memory system, the combination as claimed in claim 1, including separate means for applying separate excitations to desired ones of either said first or said second lines of said sets, said separate excitations being applied concurrently.

4. In a magnetic memory system, the combination of a plurality of magnetic cores of substantially rectangular hysteresis loop material, said cores being arranged in coordinate groupings by sets of coordinate lines, each set of lines including a plurality of pairs of coordinate lines, any pair of said lines of a set linking a group of said cores different from those linked by any other pair of lines of the same set, said groups of cores of one of said sets having certain cores in common, and some not in common, with cores of any different group of the other of said sets, a first line of any pair linking its group of cores in one sense and the second line of the same pair linking the same group of cores in the sense opposite the one sense, a separate switching means and a separate pair of junction points for each set of coordinate lines, each pair of lines of one set being connected at one extremity to one of said switching means and the first and second lines of said set being connected respectively at their other extremities to first and second junction points of one said pair of junction points, each pair of lines of the other set being connected at one extremity to another of said switching means and being connected respectively at their other extremities to first and second junction points of the other said pair of junction points, a common sensing means connected to one junction point of one said pair of junction points, and means for applying an interrogation signal to one junction point of the said other pair of junction points.

5. In a magnetic memory system, the combination comprising a plurality of cores of substantially rectangular hysteresis loop material arranged in rows and columns, a plurality of pairs of row coils having end terminals, each row coil pair linking a different row of said cores, a plurality of pairs of column coils having end terminals, each column coil pair linking a different column of said cores, a row switch and a column switch, a pair of row junction points and a pair of column junction points, said row coil pairs being connected to said row switch at one end terminal, one row coil in each pair all being connected at their other end terminals to one of said row junction points and the other row coil in each pair all being connected at their other end terminals to the other of said row junction points, said column coil pairs being connected at one end terminal to said column switch, one column coil in each pair all being connected at their other end terminals to one of said column junction points and the other column coil in each pair all being connected at their other end terminals to the other of said column junction points, a common sensing means connected to one of said row junction points, and means for applying an excitation to one of said column junction points.

6. In a magnetic memory system, the combination as claimed in claim 5, said row and column switches each including a plurality of transistors, each having collector, emitter and base electrodes, each said pairs of coils being connected to the collector electrode of a different transistor, and means for applying a saturating signal to the base electrode of any desired one of said transistors of said row switch and any desired one of said transistors of said column switch.

7. In a magnetic memory system, the combination as claimed in claim 5, said row switch including a plurality of row transistor devices, each having a current-saturated condition and an off condition, each pair of row coils being connected to a different row transistor device, said column switch including a plurality of column transistor devices, each having a current-saturated condition and an off condition, each pair of column coils being connected to a different column transistor device, and means for changing a desired row transistor device and a desired column transistor device to their saturated conditions concurrently with the application of said excitation to said one column junction point.

8. In a magnetic memory system, the combination of a plurality of magnetic cores of substantially rectangular hysteresis loop material arranged in rows and columns, a plurality of pairs of row and pairs of column coils for both writing and reading information into and out of said cores, each of said plurality of pairs of row coils being linked to a different row of said cores, each of said plurality of pairs of column coils being linked to a different column of said cores, a writing means having two outputs one of which is common to all of said pairs of column coils, means for coupling one coil of any desired one of said pairs of column coils to said one output of said writing means and one coil of any desired one of said pairs of row coils to the other output of said writing means, a read-out means having one input common to all of said pairs of column coils, and means for coupling one coil of any desired one of said pair of column coils to said read-out means.

9. In a magnetic memory system, the combination of a plurality of magnetic cores of substantially rectangular hysteresis loop material arranged in rows and columns, a plurality of pairs of row and pairs of column coils for both writing and reading information into and out of said cores, said plurality of pairs of row coils each linked to a different row of said cores, said plurality of pairs of said column coils each linked to a different column of said cores, a writing means, means for operatively coupling a desired one coil of any desired one of said pairs of row coils and a desired one coil of any desired one of said pairs of column coils to said writing means, an interrogation means having an output connected to one coil of each of said pairs of column coils, a reading means having an input connected to one coil of each of said pairs of row coils, and means for operatively coupling any desired one coil of said pairs of row coils to said reading means and any desired one coil of said pairs of column coils to said interrogation means.

10. In a magnetic memory system, the combination comprising a plurality of magnetic cores of substantially rectangular hysteresis loop material arranged in rows and columns, a plurality of pairs of row and pairs of column coils for both writing and reading information into and out of said cores, said plurality of pairs of column coils each linked to a different column of said cores, a row switch and a column switch, first, second, third, and fourth junction points, each coil of said pairs of row coils being connected at one extremity to said row switch, one coil of each of said pairs of row coils connected at its other extremity to said first junction point, and the other coil of each of sair pairs of row coils connected at its other extremity to said second junction point, each coil of said pairs of column coils being connected at one extremity to said column switch and one coil of each of said pairs of column coils being connected at its other extremity to said third junction point, and the other coil of each of said pairs of column coils being connected at its other extremity to said fourth junction point, a common sensing means connected to one of said first and second junction points, and means for applying a pulse excitation to one of said third and fourth junction points.

11. In a magnetic memory system, the combination as claimed in claim 10 including means for applying another pulse excitation to one of said first and second junction points concurrently with the applicaion of said first mentioned pulse excitation.

12. In a magnetic memory system, the combination comprising a plurality of magnetic cores each having two remanent states, said cores being arranged in coordinate groupings by sets of coordinate lines, each said set including a plurality of pairs of individual lines, each pair of lines of a set linking a group of said cores different from those linked by any other pair of lines of the same set, said groups of cores of one of said sets having certain cores in common, and some not in common, with cores of any different group of the other of said sets, a common sensing means, means for selectively coupling said sensing means to a desired coordinate line of said pairs of individual lines of a first of said sets, means for applying to any one coordinate line of said pairs of individual lines of said first and second sets separate, concurrent pulse excitations for writing information into the core common to said coordinate lines, and means for applying an interrogation pulse to a desired coordinate line of said pairs of individual lines of said second set for interrogating the core common to both of said desired coordinate lines of said first and second sets.

References Cited in the file of this patent

UNITED STATES PATENTS

| | | |
|---|---|---|
| 2,708,267 | Weidenhammer | May 10, 1955 |
| 2,814,031 | Davis | Nov. 19, 1957 |
| 2,849,705 | Haynes | Aug. 26, 1958 |
| 2,958,074 | Kilburn et al. | Oct. 25, 1960 |